INVENTOR.
CARL R. BERGER, SR.
BY
Morsell + Morsell
ATTORNEYS

United States Patent Office 3,361,302
Patented Jan. 2, 1968

3,361,302
FEED DISPENSING CARTS FOR LIVESTOCK
AND THE LIKE
Carl R. Berger, 851 W. 12th Ave.,
Oshkosh, Wis. 54901
Filed July 6, 1965, Ser. No. 469,686
1 Claim. (Cl. 222—176)

ABSTRACT OF THE DISCLOSURE

To speed and facilitate the feeding of livestock there is provided a wheeled cart having a hand-operated screw conveyor for dispensing metered quantities of feed into adjacent feed troughs, said dispensing mechanism being at the bottom of the cart so that the feed first deposited in said cart is the first dispensed, and said cart being rockable to prevent feed from sticking therein and jamming said dispensing mechanism.

---

This invention relates to improvements in feed dispensing carts for livestock and the like.

A principal object of the present invention is to provide an improved mobile cart for hauling feed for cattle or other animals, which cart is adapted to dispense the feed directly into the feeding trough, thereby greatly facilitating the feed operation and reducing the time required.

A further important object of the invention is to provide a stock feed cart having a novel, manually-operable dispensing and metering mechanism permitting the operator to vary the quantity of feed deposited at each feeding station, depending upon the requirements of the particular animal.

A further object of the present invention is to provide a novel feed dispensing cart which is especially designed to minimize the possibility of the feed sticking or bridging therein, and interfering with the operation of the dispensing mechanism.

Still further objects of the present invention are to provide a novel stock feed dispensing cart which is relatively simple and inexpensive in design, which is rugged and durable in construction, and which is otherwise particularly well adapted for its intended purposes.

With the above and other objects in view, which other objects and advantages of the device will become apparent hereinafter, the invention comprises the improved stock feed dispensing cart described in the following specification, and also any and all modifications thereof as may come within the spirit of said invention.

In the accompanying drawings, wherein there is illustrated a preferred embodiment of the invention, and wherein the same reference numerals designate the same parts in all of the views.

Figure 1:
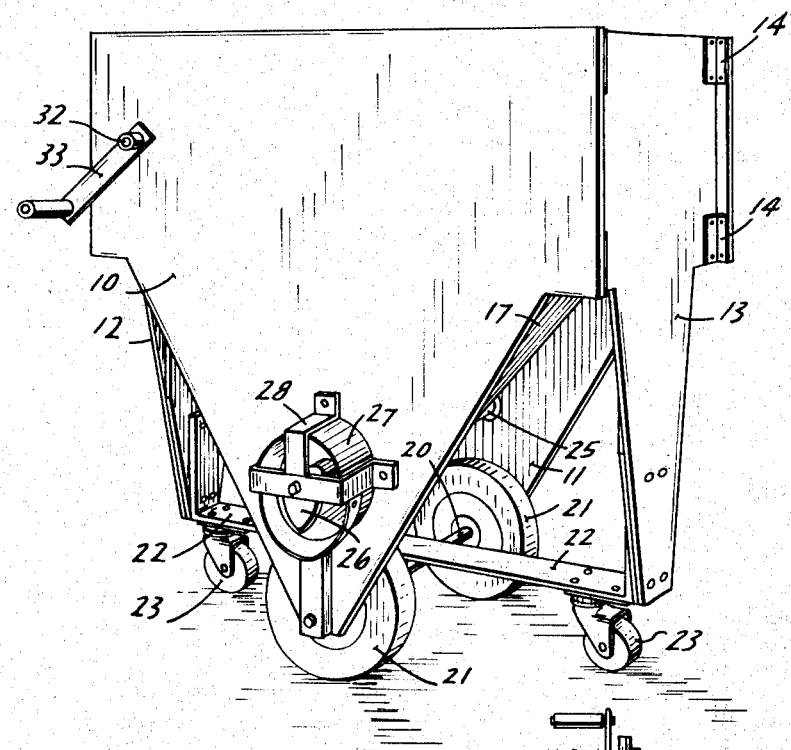
FIG. 1 is a perspective view of one side of the improved feed dispensing cart.

Referring now more particularly to the drawings, it will be seen that the improved stock feed cart comprising the present invention includes a hopper having a pair of side walls 10 and 11 and a pair of end walls 12 and 13, said hopper preferably being rectangular in form although this is not critical to the invention. As best appears in FIG. 2, a downwardly and inwardly inclined wall 15 is mounted in the cart interior along the side 11, and similarly inclined and downwardly-converging walls 16, 17 are provided at the opposite ends of the cart, thus providing a funnel-like hopper adapted to direct feed or grain therein toward the bottom 18.

Figure 3:
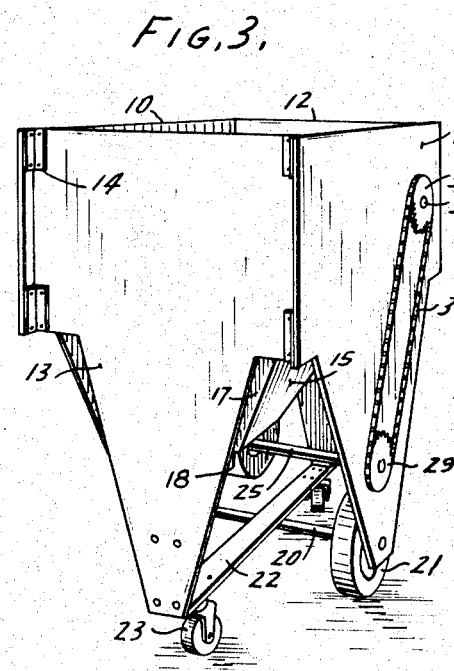
FIG. 3 is a perspective view of the side of the cart opposite that shown in FIG. 1.

As will be seen in FIGS. 1 and 3, the lower portions of the side walls 10 and 11 are tapered downwardly, as are the end walls 12 and 13, and said side and end walls are provided with overlapping edge portions joined by L-brackets 14, thus providing a simple but reliable assembly. It is preferred to use plywood in the construction of the present cart, because such material is strong, lightweight, and relatively inexpensive, but it is to be understood that various other materials could be employed, including metal or plastics, and the invention is not to be limited in this respect.

Carried by and between the lower portions of the side walls 10, 11 is an axle 20, and mounted thereon adjacent said walls are a pair of spaced, ground-engaging wheels 21. Extending between the lower end portions of the end walls 12, 13 is a longitudinal strut 22, and supported thereon adjacent said end walls are swivel casters 23. Said casters are mounted an inch or so higher than the main wheels 21 so that both of said casters will not engage the ground at the same time, thus permitting the operator to rock the wagon occasionally to shake the feed therein to prevent said feed from sticking or bridging within the hopper. This is an important feature of the present invention as it minimizes the possibility of said feed clogging the dispensing mechanism.

Figure 2:
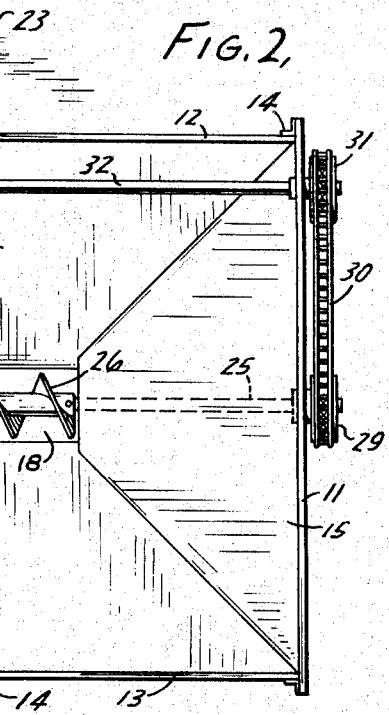
FIG. 2 is a top plan view of the cart.

With reference now to FIG. 2 of the drawing, it will be seen that a screw conveyor shaft 25 is carried by and between the lower portions of the hopper side walls 10, 11, said shaft being journaled in suitable bearings, and mounted thereon is a screw conveyor 26 which extends from the wall 15 outwardly through the cart side wall 10, the end of said screw projecting beyond said wall as shown. Mounted on the cart side wall in covering relation to said projecting screw is a cylindrical housing 27 which is secured to the cart by a bracket 28, or other suitable retaining means, and which housing has an open outer end through which feed from the hopper can be discharged, as will be hereinafter described. Said discharge chute is designed so that feed ejected therethrough will be directed into a conventional feeding trough. The opposite end of the screw conveyor shaft 25 is projected through the cart side wall 11 (FIGS. 2 and 3), and mounted on the outer extremity thereof is a sprocket 29, thus providing means for turning said screw conveyor to urge feed in the lower portion of the hopper outwardly through the discharge chute 27 and into a feeding trough, as will be described.

Extending between and rotatably journaled in the upper portions of the cart side walls 10, 11, adjacent the rear thereof is a rod 32 which projects outwardly a short distance beyond said walls, as shown. A crank or handle 33 is mounted on one end of said rod, on the exterior of the cart side wall 10, and mounted on the opposite end of the rod on the exterior of the cart wall 11 is a sprocket 31. Trained about said sprocket and about the sprocket 29 carried on the screw conveyor shaft is an endless chain 30 providing a drive connection between the handle or crank 33 and said screw conveyor 26.

In the use of the novel feed dispensing cart comprising the present invention, after filling the cart with feed or grain the operator can manually push the same into the barn or other feeding station, the swivel caster wheels and lightweight construction of said cart making it very maneuverable and easy to push. Said cart is positioned adjacent the feeding trough, with the discharge chute 27 arranged above and in alignment with said trough, and the operator manually turns the crank 33. As described, said crank is operatively connected to the screw conveyor 26 through the sprocket and chain assembly 29–31, and the turning of said crank causes said rotatable screw to convey feed in the lower portion of the hopper laterally outwardly through said discharge chute 27 and into the trough as the cart advances therealong. The quantity of feed discharged is dependent upon the number of times the handle 33 is turned, and because said dispensing mechanism is manually operable the operator may accurately meter the feed deposited at each stall or feeding station to correspond to the requirements of the particular cow or other animal. The result is the elimination of wasteful overfeeding, and also underfeeding, which results in loss of production and milk yield in cows. Moreover, it has been found that with the use of the present invention the time normally required to feed the stock is reduced by approximately 50%.

As hereinabove mentioned, the caster wheels 23 are swivel-mounted to permit the easy turning and maneuvering of said cart, and said caster wheels are also mounted an inch or so higher than the main cart wheels 21 to permit the operator to manually rock the wagon intermittently to shake the feed therein and to thereby eliminate the possibility of said feed sticking or bridging within the hopper and impeding the operation of the discharge mechanism. The result is a dispensing cart which not only greatly facilitates and speeds the feeding operation, but which feed dispensing cart is exceedingly reliable in operation.

A further important advantage of the novel dispensing cart comprising the present invention is that because the discharge means is located at the bottom of the cart the grain or feed initially deposited in said cart is also the first to be discharged, thus minimizing the possibility of said grain becoming rancid or inedible. This is in contrast to conventional feed delivery carts wherein the grain is ladled from the top of said cart, and wherein the grain initially deposited therein is the last to be discharged.

From the foregoing detailed description, it will be seen that the present invention provides a novel feed dispensing cart for livestock and the like which is a decided improvement in the art. It is to be understood, of course, that the invention is not to be limited or confined to a structure identical in all respects to that illustrated and hereinbefore described. What is intended to be covered herein is the illustrated feed dispensing cart and also any and all modifications or variations thereof as may come within the spirit of said invention, and within the scope of the following claim.

What I claim is:

1. A mobile stock feed dispensing cart, comprising: a hopper having a bottom, having first and second side walls with downwardly-tapered lower portions, said first side wall having a discharge opening in said lower portion, and said hopper having a pair of end walls with downwardly-tapered lower portions; a plurality of inclined inner wall elements in said hopper converging downwardly to form a funnel-like structure adapted to direct feed therein downwardly and inwardly toward said bottom; an axle carried by and between the lower end portions of said side walls below said hopper bottom; a pair of spaced ground-engaging wheels mounted on said axle adjacent said side walls; a longitudinal strut carried by and between the lower portions of said hopper end walls; a pair of swivel casters mounted on said strut adjacent said end walls, said casters being positioned slightly higher than said ground-engaging wheels so that both of said casters do not engage the ground at the same time; a discharge chute on the exterior of said hopper first side wall in registration with said wall opening, said discharge chute having an opening therein positioned to direct feed discharged therethrough into an adjacent feed trough; a screw conveyor shaft rotatably carried by and between said hopper side walls, said shaft extending laterally outwardly through said discharge opening beyond said walls; a screw conveyor on said shaft extending substantially the length of said hopper bottom and projecting into said discharge chute, said screw conveyor being adapted to convey feed in the bottom portion of the hopper outwardly through said discharge chute and into an adjacent trough; a sprocket mounted on the opposite end of said screw conveyor shaft on the exterior of said hopper second side wall; a rod rotatably carried by and between the upper, rear portions of said hopper side walls, said rod projecting beyond said walls; a crank handle mounted on one projecting end of said rod on the exterior of said first side wall; a sprocket mounted on the opposite end of said rod; and a chain trained about said sprocket and about the screw shaft sprocket to provide a drive connection therebetween whereby said screw conveyor can be rotated in response to manual turning of said crank handle to dispense predetermined quantities of feed into a trough as the cart is pushed therealong.

References Cited

UNITED STATES PATENTS

| | | | |
|---|---|---|---|
| 2,299,702 | 10/1942 | Mosel | 222—176 X |
| 2,649,965 | 8/1953 | King et al. | 280—47.16 X |
| 3,198,398 | 8/1965 | Schreiber | 222—176 |

ROBERT B. REEVES, *Primary Examiner.*